United States Patent
Northeast et al.

(10) Patent No.: US 11,867,663 B2
(45) Date of Patent: Jan. 9, 2024

(54) ACOUSTIC EMISSION SENSING IN POWDER BED ADDITIVE MANUFACTURING

(71) Applicant: RENISHAW PLC, Wotton-under-Edge (GB)

(72) Inventors: Damon Mark Northeast, Stroud (GB); Jonathan Mansell, Bristol (GB); Nicholas Henry Hannaford Jones, Stroud (GB)

(73) Assignee: RENISHAW PLC, Wotton-Under-Edge (GB)

( * ) Notice: Subject to any disclaimer, the term of this patent is extended or adjusted under 35 U.S.C. 154(b) by 399 days.

(21) Appl. No.: 16/973,333

(22) PCT Filed: Jun. 26, 2019

(86) PCT No.: PCT/GB2019/051799
§ 371 (c)(1),
(2) Date: Dec. 8, 2020

(87) PCT Pub. No.: WO2020/008171
PCT Pub. Date: Jan. 9, 2020

(65) Prior Publication Data
US 2021/0245250 A1     Aug. 12, 2021

(30) Foreign Application Priority Data
Jul. 2, 2018   (EP) .................................. 18181186

(51) Int. Cl.
*G01N 29/14*      (2006.01)
*B33Y 30/00*      (2015.01)
(Continued)

(52) U.S. Cl.
CPC ............. *G01N 29/14* (2013.01); *B22F 10/28* (2021.01); *B22F 10/31* (2021.01); *B22F 10/40* (2021.01);
(Continued)

(58) Field of Classification Search
CPC ........... G01N 29/14; G01N 2291/0258; B22F 10/28; B22F 10/31; B22F 10/40;
(Continued)

(56) References Cited

U.S. PATENT DOCUMENTS

| 5,150,714 A | 9/1992 | Green |
| 5,677,489 A * | 10/1997 | Spillman, Jr. .......... G10K 11/24 73/598 |

(Continued)

FOREIGN PATENT DOCUMENTS

| CN | 103171150 A | 6/2013 |
| CN | 104363856 A | 2/2015 |

(Continued)

OTHER PUBLICATIONS

Jun. 24, 2021 U.S. Office Action issued U.S. Appl. No. 16/928,593.
(Continued)

*Primary Examiner* — Michael J Brown
(74) *Attorney, Agent, or Firm* — Oliff PLC (57) ABSTRACT

A powder bed additive manufacturing apparatus includes a build sleeve, a build platform for supporting a powder bed and object during a build, the build platform lowerable in the build sleeve, and at least one acoustic sensing system. The acoustic sensing system includes an acoustic emission sensor and an acoustic waveguide. The acoustic waveguide extends through the build platform such that a receiving end of the acoustic waveguide distal from the acoustic emission sensor abuts a surface of a build substrate removable mounted to the build platform to transmit structure-borne (Continued)

acoustic waves from the build substrate to the acoustic emission sensor.

10 Claims, 8 Drawing Sheets

(51) Int. Cl.
*B22F 10/28* (2021.01)
*B33Y 50/02* (2015.01)
*B22F 10/31* (2021.01)
*B22F 10/85* (2021.01)
*B22F 12/00* (2021.01)
*B22F 12/30* (2021.01)
*B22F 12/70* (2021.01)
*B22F 10/40* (2021.01)
*B22F 12/90* (2021.01)
*B22F 12/45* (2021.01)

(52) U.S. Cl.
CPC ............ *B22F 10/85* (2021.01); *B22F 12/222* (2021.01); *B22F 12/30* (2021.01); *B22F 12/70* (2021.01); *B33Y 30/00* (2014.12); *B33Y 50/02* (2014.12); *B22F 12/45* (2021.01); *B22F 12/90* (2021.01)

(58) Field of Classification Search
CPC ........ B22F 10/85; B22F 12/222; B22F 12/30; B22F 12/70; B22F 12/90; B22F 12/45; B33Y 30/00; B33Y 50/02; B33Y 50/00; Y02P 10/25; B29C 64/20; B29C 64/153; B29C 64/194; B29C 64/386
USPC ....................................................... 700/118
See application file for complete search history.

(56) References Cited

U.S. PATENT DOCUMENTS

| | | | |
|---|---|---|---|
| 5,753,274 | A | 5/1998 | Wilkening et al. |
| 6,553,275 | B1 | 4/2003 | Mazumder |
| 9,918,811 | B2 | 3/2018 | Beeby et al. |
| 10,562,288 | B2 | 2/2020 | Lavrentyev et al. |
| 2007/0176312 | A1 | 8/2007 | Clark et al. |
| 2009/0041825 | A1 | 2/2009 | Kotov et al. |
| 2009/0152771 | A1 | 6/2009 | Philippi et al. |
| 2015/0115490 | A1 | 4/2015 | Reinarz |
| 2015/0177158 | A1 | 6/2015 | Cheverton |
| 2015/0314373 | A1 | 11/2015 | Mironets et al. |
| 2016/0325541 | A1 | 11/2016 | Lavrentyev et al. |
| 2017/0146488 | A1 | 5/2017 | Gold et al. |
| 2017/0146489 | A1 | 5/2017 | Redding et al. |
| 2018/0154484 | A1* | 6/2018 | Hall ........................ B33Y 10/00 |
| 2018/0264735 | A1 | 9/2018 | Vilajosana et al. |

FOREIGN PATENT DOCUMENTS

| | | |
|---|---|---|
| CN | 107042628 A | 8/2017 |
| CN | 107206689 B | 10/2020 |
| DE | 10 2011 008 774 A1 | 7/2012 |
| GB | 2283113 A | 4/1995 |
| NO | 2010/007394 A1 | 1/2010 |
| WO | 95/11100 A1 | 4/1995 |
| WO | 2004/024447 A2 | 3/2004 |
| WO | 2007/147221 A1 | 12/2007 |
| WO | 2009/112799 A2 | 9/2009 |
| WO | 2010/007396 A1 | 1/2010 |
| WO | 2011/059621 A1 | 5/2011 |
| WO | 2012/097799 A2 | 7/2012 |
| WO | 2015/092442 A1 | 6/2015 |
| WO | 2015/109096 A1 | 7/2015 |
| WO | 2016/081651 A1 | 5/2016 |
| WO | 2016/198885 A1 | 12/2016 |

OTHER PUBLICATIONS

Kanji Ono, "Acoustic Emission in Materials Research—A Review", J. Acoustic Emission, vol. 29, (2011), pp. 284-308.
Wadley, H.N.G. et al., "Acoustic Emission for Materials Processing: A Review", Materials Science & Engineering, vol. 65 (1984), pp. 245-263.
"An Acoustic Emission Study of Martensitic and Bainitic Transformations in Carbon Steel", Materials Science & Technology, Delft University of Technology, Rotterdamseweg 137, 2628 AL Delft, The Netherlands, pp. 1-157.
Sep. 13, 2016 Search Report issued in International Patent Application No. PCT/GB2016/051720.
Sep. 13, 2016 Written Opinion issued in International Patent Application No. PCT/GB2016/051720.
Sep. 16, 2019 Written Opinion issued in International Patent Application No. PCT/GB2019/051799.
Sep. 16, 2019 Search Report issued in International Patent Application No. PCT/GB2019/051799.
U.S. Appl. No. 16/928,593, filed Jul. 14, 2020 in the name of Hall.
Babjak et al. "Analysis and Efficient Onset Time Detection of Acoustic Emission Signals with Power Constrained Sensor Platform".
Dec. 12, 2018 Extended Search Report issued in European Patent Application No. 18181186.0.
Sep. 16, 2019 Extended Search Report issued in European Patent Application No. 19182673.4.

* cited by examiner

ACOUSTIC EMISSION SENSING IN POWDER BED ADDITIVE MANUFACTURING

FIELD OF INVENTION

This invention concerns acoustic emission sensing in powder bed additive manufacturing. The invention has particular, but not exclusive, application to acoustic emission sensing of acoustic waves that propagate through a build substrate on which an object is built during a powder bed additive manufacturing (AM) process.

BACKGROUND

Powder bed additive manufacturing or rapid prototyping methods for producing objects comprise layer-by-layer solidification of a powder, such as a metal powder material, using a high energy beam, such as a laser or electron beam. A powder layer is deposited on a powder bed in a build chamber and the laser or electron beam is scanned across portions of the powder layer that correspond to a cross-section of the object being constructed. The laser or electron beam melts or sinters the powder to form a solidified layer. After selective solidification of a layer, the powder bed is lowered by a thickness of the newly solidified layer and a further layer of powder is spread over the surface and solidified, as required.

WO2016/198885 discloses powder bed additive manufacturing apparatus and a method for detecting structure-borne acoustic emission waves generated during the additive manufacturing process. The acoustic emission (AE) sensors may be located remotely beneath the build substrate upon which powder layers are melted and/or beneath the build platform. In the case of conventional wideband PZT-based AE sensors, the sensor wear face can be permanently attached to a suitable flat planar face of the AM machine using known acoustic coupling methods (i.e. ultrasonic gels, grease, rigid adhesive). AE location methods can be adapted to make location estimations within the AE system (e.g. Delta-T localisations via grid calibration of the build plate substrate).

A problem with coupling the AE sensors to a lower flat surface of the build substrate is that the ultrasonic gels, grease or rigid adhesive used to achieve the desired coupling can contaminate the powder within the apparatus. This problem could be solved by coupling the AE sensors to a lower flat surface of the build platform as a seal is located around the build platform to retain the powder above the build platform and therefore, away from a lower surface of the build platform. However, the sandwich structure of the build platform and thermally insulative layers within the build platform used to reduce heat conduction to regions below the build platform tend to attenuate the structure borne acoustic signals to unacceptably low levels.

Delta-T mapping of a structure is typically carried out using the Hsu-Nielson method, which comprises the breaking of a pencil lead at grid locations on a surface of the structure. Such a process can take a long time and, if carried out in a powder bed AM apparatus, can result in contamination of the powder bed AM apparatus with graphite/pencil lead.

WO2015/109096 A1 discloses an additive manufacturing system including an ultrasonic inspection system. The ultrasonic inspection system has a plurality of ultrasonic sensors organized as an array that may be integrated into and movable with the build table. The table has a substantially horizontal sheet having a top face that supports and may be in direct contact with a bottom slice of a plurality of slices of the workpiece. An opposite bottom face of the sheet may be in direct contact with a buffer of each sensor. Each sensor also has a transducer such that the buffer is located directly between the transducer and the bottom face.

US2015/0314373 A1 discloses a build plate for an additive manufacturing system including a support structure, a sub-plate and one or more transducers. The support structure is configured to support a stack of sintered layers of a pulverant material. The one or more transducers are operable to cause vibration of the support structure to relieve internal stresses caused by sintering the stack.

DE102011008774 A1 discloses additive manufacturing apparatus comprising an ultrasonic transducer including a transmitter device for transmitting ultrasonic pulses. The ultrasonic transducer device may be formed integrally with the build platform.

CN107042628 A discloses a fused deposition modelling apparatus comprising an ultrasonic transducer fixed to the bottom of a supporting plate

SUMMARY OF INVENTION

According to a first aspect of the invention there is provided a powder bed additive manufacturing apparatus comprising a build sleeve, a build support for supporting a powder bed and object during a build, the build support lowerable in the build sleeve, and at least one acoustic sensing system extending to the build support to detect structure-borne acoustic waves.

The build support may be a build platform of an elevator mechanism and the at least one acoustic sensing system may extend into the build platform to detect structure-borne acoustic waves. The at least one acoustic sensing system may extend into the build platform to detect structure-borne acoustic waves at an internal surface of the build platform sealed from powder of the powder bed.

In this way, the acoustic sensing system can be acoustically coupled to the internal surface of the build platform using ultrasonic gels or grease without the risk of contamination of the powder in the apparatus and bypassing layers/interfaces of the build platform that would otherwise act to attenuate the acoustic signals to an undesirably low level. A collection surface of the acoustic sensing system, such as a wear surface of the acoustic emission sensor or a receiving end of a waveguide connected to an acoustic emission sensor, may be acoustically coupled to, for example abutted against, optionally, with ultrasonic gel or grease therebetween, an upper plate, such as a top plate, of the build platform, for example a metallic or ceramic top plate. The upper plate may have an acoustic attenuation coefficient for structure borne AE waves lower than that for other lower layers of the build platform. The lower layers of the build platform bypassed by the acoustic sensing system may be thermal insulative layers, such as layers of glass fibre reinforced plastic, which reduce conduction of heat to below the build platform but also significantly attenuate acoustic signals. Furthermore, the build platform may comprise a sandwich structure of different layers and the acoustic sensing system bypasses one or more interfaces between the different layers. The interface between layers can act as a surface for reflecting acoustic waves. Accordingly, by bypassing the interfaces, undesirable attenuation of the acoustic waves is avoided.

The build platform may comprise an insulation layer below the upper plate. The insulation layer may insulate regions below from heat generated at the upper plate. For example, heat may be generated by the laser beams solidifying the powder and/or a heating element provided between the upper plate and the insulation layer. By abutting the collection surface of the acoustic sensing system against the upper plate, the acoustic sensing system can detect structure borne acoustic waves that have not been attenuated by the insulation layer.

The build platform may be part of an elevator mechanism on which a build substrate is, typically releasably, mounted. The concept of a build substrate separable from and mounted to a build platform is disclosed in U.S. Pat. No. 5,753,274.

In the case of the build support being the build platform, the upper plate may comprise an upper mounting plate on which the build substrate is mounted during an additive manufacturing process, the collection surface abutted against a lower surface of the upper mounting plate.

The acoustic sensing system may comprise an acoustic sensor and an acoustic waveguide arranged to transmit structure borne acoustic waves from the build support to the acoustic emission sensor.

The acoustic waveguide may extend into the build support such that a receiving end of the acoustic waveguide distal from the acoustic emission sensor is located within the build support to be sealed from powder of the powder bed. The acoustic waveguide may extend into the build support such that a receiving end of the acoustic waveguide distal from the acoustic emission sensor abuts the lower surface of the upper plate. In this way, the acoustic emission sensor can be maintained away from the heat generated in the region of the upper plate, in particular can be located below a thermally insulative layer in a region that is relatively cool compared to the upper plate. An upper, top plate of the build platform may operate at temperatures of 170 degrees centigrade or greater and these temperatures are at the upper limits of the operating temperatures of a typical acoustic emission sensor. Furthermore, the build platform may comprise a heating element for raising the top plate to such temperatures, as heating of the powder bed can be beneficial for the additive process. Accordingly, the acoustic waveguide acts to space the acoustic emission sensor away from these heated regions of the build platform.

The acoustic waveguide may extend into channels in the build platform that open to a lower surface of the build platform.

The build platform may comprise an upper mounting plate on which the build substrate is mounted during the additive manufacturing process. The acoustic waveguide may extend through channels in a lower portion of the build platform and the receiving end of the acoustic waveguide abutted against a lower surface of the upper mounting plate. The acoustic waveguide may be secured to the upper, mounting plate using appropriate fixing means, such as bolts or an adhesive. The build platform may comprise a layer of thermally insulative material and the acoustic waveguide may extend through channels in the layer of thermally insulative material to the upper mounting plate. The build platform may comprise a heater, such as a resistive heater, and the upper mounting plate may be mounted above and in thermal contact with the heater. The layer of thermally insulative material may be located below the resistive heater for limiting thermal conduction to a region of the apparatus below the build platform.

The upper plate may comprise mounting formations for the mounting of the build substrate and the collection surface of the acoustic sensing system may be located in the build support in the vicinity of a one of the mounting formations, for example, within 30 mm, and preferably 20 mm of the mounting formation. The apparatus may comprise three or more acoustic emission sensors and corresponding acoustic sensing systems, such as acoustic emission sensors and corresponding acoustic waveguides. The mounting formations may comprise three or more mounting formations distributed across the build support, wherein a collection surface of each acoustic sensing system is located within a vicinity of a different one of the mounting formations. The collection surface of each acoustic sensing system may be located closer to a corresponding mounting formation than to each other. Locating the collection surface of the or each acoustic sensing system in the vicinity of the mounting formation ensures that the structure borne waves detected by the acoustic sensing system are dominated by the structure-borne waves transmitted through a single mounting formation.

Alternatively, the at least one acoustic sensing system may extend to a build substrate, that is typically releasably attachable to the build platform. The at least one acoustic sensing system may extend through the build platform to abut a lower surface of the build substrate. The acoustic waveguide may extend through the build platform such that a receiving end of the acoustic waveguide distal from the acoustic emission sensor abuts a surface of a build substrate removable mounted to the build platform to transmit structure-borne acoustic waves from the build substrate to the acoustic emission sensor.

The acoustic waveguide may extend into channels in the build substrate open to a lower surface of the build substrate. A sealant may be used to seal a receiving end of the acoustic waveguide to powder. The build substrate may comprise a lower, carrier plate comprising mounting formations, such as kinematic mounting formations disclosed in WO 2015/092442, incorporated herein by reference, for mounting the build substrate on a build platform of the powder bed additive manufacturing apparatus and an upper build plate on which the object is built during the additive manufacturing process. The acoustic waveguide may extend through channels in the lower, carrier plate and the receiving end of the acoustic waveguide abutted against a lower surface of the upper build plate.

The waveguide may extend through a channel in the build platform that is open at an upper surface of the build platform such that the waveguide is able to contact the build substrate when mounted on the upper surface of the build platform.

The acoustic waveguide may be secured to the build substrate, for example the upper, build plate, using appropriate fixing means, such as bolts or an adhesive. The waveguide may comprise a threaded bore for engaging a threaded member, such as a bolt, inserted through a hole in the build substrate. The fixing means may be configured to hold the acoustic waveguide against the build substrate. The fixing means may be configured to pull or push the acoustic waveguide through the channel to contact the build substrate.

The waveguide may be held within the channel in the build platform so as to be movable within the channel towards the build substrate mounted on the upper surface. For example, threaded cooperating members, such as a bolt and complementary threaded bore, may be engaged to pull the waveguide through the channel against the build substrate. If an adhesive is used, a force may be applied to push the waveguide through the channel to contact the build substrate, with an adhesive having been applied to ensure that contact is maintained upon release of the force. In this way, sufficient contact with the build substrate is achieved to ensure adequate acoustic transmissions to the acoustic sensor.

The complementary threaded bore may be in the waveguide and the bolt may extend through the build substrate such that access to the bolt for tightening within the complementary threaded bore is provided at a top of the build substrate.

With the channel open at an upper surface of the build platform and a threaded bore in the waveguide, it may be possible for small amounts of powder to enter the channel and the threaded bore. Accordingly, the threaded bore in the waveguide may comprise a gas inlet arranged in proximity to a distal end of the threaded bore (the distal end distal from a proximal end comprising an opening that receives the bolt) to allow gas to be drawn into the distal end of the bore. In this way, powder can be sucked from the bore through the application of a vacuum to the opening to the bore. A gas passageway may connect the gas inlet in gaseous communication to the bore. The gas passageway may be arranged, for example be angled and have sufficient length, such that powder that enters the gas passageway from the bore does not flow to the gas inlet during normal operation. For example, the gas passageway may be dimensioned such that powder does not flow to the gas inlet due to the angle of repose of the powder. The gas passageway may extend horizontally or be inclined from the bore to the gas inlet. The acoustic sensing system may comprise a powder trap arranged to capture powder that enters the gas passageway. The powder trap may surround a portion of the waveguide including the gas inlet. The powder trap may comprise a floor and an upstanding outer wall that define a recess for capturing the powder. The upstanding wall may extend beyond an opening of the channel at a lower surface of the build platform such that powder falling from the channel is captured within the recess. The powder trap may prevent powder that falls through the channel from interacting with devices of the additive manufacturing apparatus located below the build platform. Powder that enters into and remains in the threaded bore of the waveguide can, through repeated engagement and disengagement of the bolt with the threaded bore, wear away the threads of the bolt and the bore, requiring eventual replacement of the parts. By providing the gas inlet, powder that enters the threaded bore can sucked therefrom through application of a vacuum, reducing or eliminating wear of the parts due to the presence of powder.

A width of the channels may be such that the acoustic waveguide is spaced from walls of the channels. In this way, acoustic waves transmitted along the acoustic waveguide are not damped through contact of the acoustic waveguide with the walls.

According a second aspect of the invention there is provided a method of calibrating an acoustic emission system within a powder bed additive manufacturing apparatus comprising a build platform on which a build substrate is mounted during additive manufacturing of an object, the build support for supporting a powder bed and the object, and the acoustic emission system comprising a plurality of acoustic emission sensors acoustically coupled to the build platform and/or a build substrate, the method comprising carrying out a plurality of exposures of the build substrate with an energy beam, the different exposures carried out at different locations on the build substrate; for each exposure, determining an arrival time at each acoustic emission sensor for a structure-borne acoustic wave generated by the exposure and generating a calibration map for locating sources of acoustic waves from the object built on the build substrate from differences in the arrival times determined for the acoustic emission sensors for each exposure.

In this way, a build substrate can be automatically calibrated for subsequent detection of structure borne acoustic waves generated during the additive manufacturing of the object. The generation and detection of the structure-borne acoustic waves generated by the exposures may be carried out much more quickly than Delta-T mapping of the build support using the Hsu-Nielson method. Furthermore, the method does not risk contamination of the apparatus with graphite/pencil lead. A build substrate is attached to the build platform for each build using fastening mechanisms, such as bolts. After each build, the build substrate is removed from the build platform and the additive built object(s) are removed from the build substrate. Once the objects have been removed, the build substrate is reconditioned, for example by machining, for a subsequent build. The machining of the build substrate and small changes in the attachment of the build substrate to the build platform can result in changes in the transmission of the structure-borne acoustic waves to the acoustic emission sensors. Hence, it is desirable to calibrate the build substrate at the beginning of each build.

The exposures may be arranged as a grid of points distributed across the build substrate. Each exposure may be for less than 60 microseconds, preferably less than 30 microseconds and most preferably, less than 10 microseconds. A delay between each exposure may be greater than 10 microseconds, preferably greater than 50 microseconds and most preferably greater than 100 microseconds. Such a delay ensures that an acoustic wave generated by an exposure is not masked by the acoustic wave generated by the previous exposure. In particular, for calibrating a build substrate for arrival times of acoustic waves, it is desirable that there is a minimal background acoustic signal before arrival of the acoustic signal generated by the exposure.

A plurality of exposures may be carried out at each point. The calibration map may be determined from a subset of the differences in arrival times determined for each point, for example, outliers in the determined differences in arrival times may be removed from consideration.

The arrival (onset) time of a structure borne acoustic wave at an acoustic sensor may be determined using Akiake's Information Criterion as described in Analysis and Efficient Onset Time Detection of Acoustic Emission Signals with Power Constrained Sensor Platform, IEEE Sensors, Babjak, B., S. Szilvasi, P. Volgyesi, O. Yapar, and P. K. Basu, 2013.

According to a third aspect of the invention there is provided a data carrier having instructions thereon, which, when executed by a processor of a powder bed additive manufacturing apparatus, causes the processor to control the powder bed additive manufacturing apparatus to carry out the method of the second aspect of the invention.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example signals sent over a wired or wireless network (such as an Internet download, an FTP transfer, or the like).

According to a third aspect of the invention there is provided a controller for controlling a powder bed additive manufacturing apparatus, the controller comprising a processor arranged to cause the powder bed additive manufacturing apparatus to carry out the method according to the second aspect of the invention.

According to a fourth aspect of the invention there is provided a powder bed additive manufacturing apparatus comprising a controller according to the third aspect of the invention.

According to a fifth aspect of the invention there is provided a powder bed additive manufacturing apparatus comprising a build sleeve, a build support for supporting a powder bed and object during a build, the build support lowerable in the build sleeve, and at least one acoustic sensing system to detect structure-borne acoustic waves transmitted through the build support.

DESCRIPTION OF EMBODIMENTS

Figure 1:
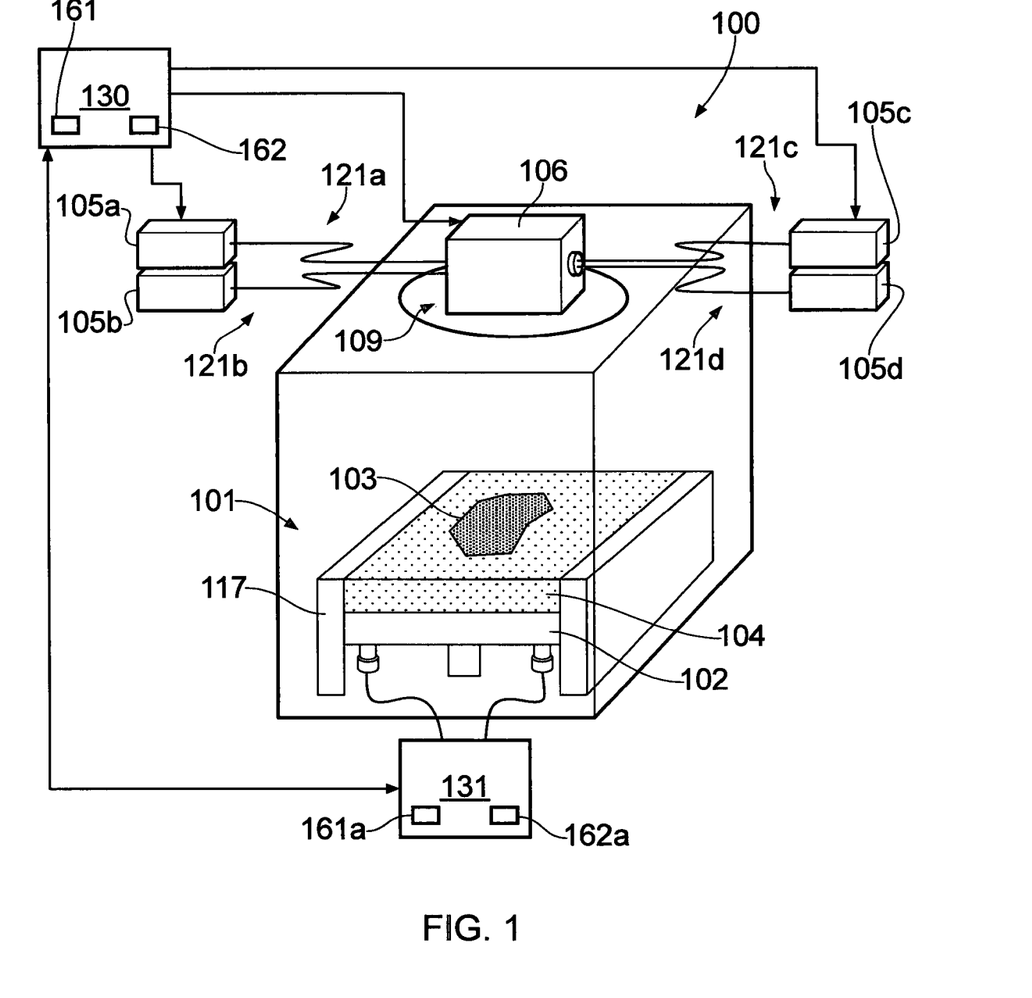
FIG. 1 is a schematic view of a powder bed additive manufacturing apparatus according to an embodiment of the invention.

Referring to FIG. 1, an additive manufacturing apparatus 100 according to an embodiment of the invention comprises a build chamber 101 having therein a build sleeve 117 and a build platform 102 lowerable in the build sleeve 117 under the control of a drive (not shown). The build platform 102 supports a powder bed 104 and workpiece 103 as the workpiece is built by selective laser melting of the powder. During additive manufacturing, the platform 102 is lowered within the build sleeve 117 under the control of the drive as successive layers of the workpiece 103 are formed through the selective solidification of powder.

Layers of powder 104 are formed as the workpiece 103 is built by dispensing apparatus and a wiper (not shown). For example, the dispensing apparatus may be apparatus as described in WO2010/007396. A position of a lower edge of the wiper defines a working plane at which powder is consolidated.

A plurality of laser modules 105a, 105b, 105c and 105d generate laser beams for melting the powder 104 and the laser beams are transmitted to a scanner 106 by fibre cables 121a to 121d. The scanner 106 directs the laser beams to the working plane as required under the control of controller 130 to solidify areas of each layer of the powder bed 104. The laser beams enter the build chamber 101 through a common laser window 109.

The controller 130, comprising processor 161 and memory 162, is in communication with modules of the additive manufacturing apparatus, namely the laser modules 105a, 105b, 105c, 105d, scanner 106, drive of the build platform 102, dispensing apparatus and a drive of the wiper. The controller 130 controls the modules to carry out an additive manufacturing process to build a part layer by layer. During this process, acoustic signals transmitted through the build platform 102 are monitored by an acoustic sensing apparatus.

The acoustic sensing apparatus comprises a plurality, in this embodiment, four, acoustic sensing systems AI0, AI1, AI2, AI3 (see FIG. 3), which extend into the build platform 102 to detect structure borne acoustic waves that are transmitted through a top plate 110 of the build platform 102. The electrical signals generated by the acoustic sensing systems AI0, AI1, AI2, AI3 are transmitted to a further controller 131 for analysis.

Figure 2:
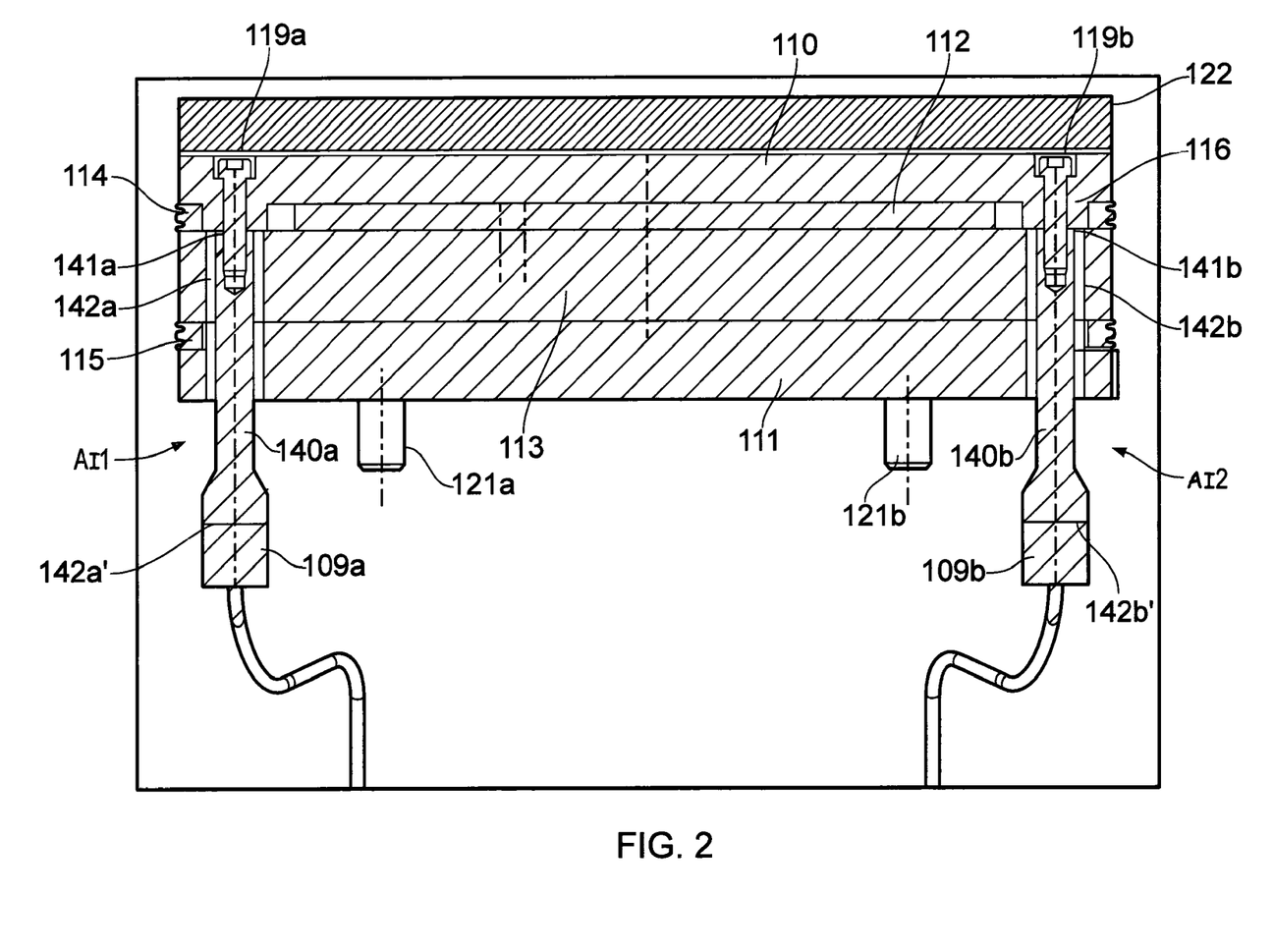
FIG. 2 shows a cross-sectional view along the line A-A of a build platform of the powder bed additive manufacturing apparatus shown in FIG. 1.

FIG. 2 shows the build platform 102 and acoustic sensing systems in more detail.

Each acoustic sensing system AI0, AI1, AI2, AI3 comprises an acoustic waveguide 140a, 140b arranged to transmit structure borne acoustic waves from the top plate 110 of the build platform 102 to an acoustic emission sensor 109a, 109b. In this embodiment, the acoustic emission sensors 109a, 109b comprise differential piezoelectric acoustic emission sensors.

The build platform has a sandwich structure comprising the top plate 110, a bottom plate 111 and sandwiched therebetween a heating element 112 and a layer of thermal insulation 113. The top plate 110 has a circumferential downwardly extending flange 116 engaging the insulation layer 113 to provide a space in which the heating element 112 is located. Four channels 142a, 142b are provided at the four corners of the bottom plate 111 and insulation layer 113, each for receiving one of the acoustic waveguides 140a, 140b such that a distal, receiving end 141a, 141b of each acoustic waveguide 140a, 140b contacts the flange 116 of the top plate 110. Fastening means, in this embodiment in the form of bolts 119a, 119b, secures the acoustic waveguide 140a, 140b to the top plate 110. An ultrasonic gel or grease may be provided on the receiving end 141a, 141b of each acoustic waveguide to facilitate the transmission of structure-borne acoustic waves from the top plate 110 to the acoustic waveguide 140a, 140b, although it is believed that mechanical clamping alone can provide an acceptable connection for acoustic transmission to the waveguides.

Each channel 142a, 142b has a diameter such that the corresponding waveguide 140a, 140b is spaced from walls of the thermally insulative material of the insulation layer 113 and the material of the bottom plate 111 that define the channel 142a, 142b. Thus, structure borne acoustic waves transmitted along the acoustic waveguide are not damped through contact of the acoustic waveguide with the walls. In this embodiment, the acoustic waveguides 140a, 140b are solid stainless steel rods, which provide a good medium for transmitting structure borne acoustic waves but, as poor thermal conductors, thermally insulate the acoustic emission sensors 109a, 109b from the top plate 110.

A termination end 142a, 142b of each waveguide 140a, 140b is connected to a wear surface of the acoustic emission sensor 108a, 108b.

Each acoustic waveguide 140a, 140b causes a wave to propagate in a longitudinal direction of the waveguide to the corresponding acoustic emission sensor 109a, 109b with some measure of confinement in the planes transverse to the longitudinal direction of propagation. In this way, the acoustic emission sensors 109a, 109b can be spaced away from and therefore, partially thermally insulated from the heating element 112 and top plate 110, both of which can reach temperatures above the operating temperature of the acoustic emission sensors 108a, 108b. A temperature difference between a distal, receiving end and proximal, termination end of the waveguide may be 30 degrees centigrade or more. If the acoustic emission sensors were directly connected to a lower surface of the bottom plate 111, the structure borne acoustic waves would be severely attenuated before reaching the acoustic sensors, particularly by the intervening insulation layer 113 and the multiple interfaces between the layers of the build support 102.

Two seals 114 and 115 extend around the build platform 102 to seal the build platform 102 against the build sleeve 117 such that powder is retained above the build platform 102 as it is lowered in the build sleeve 117. Accordingly, powder is prevented from reaching the acoustic waveguides 140a, 140b and the acoustic emission sensors 109a, 109b.

Movement of the build platform 102 in the build sleeve 117 is driven by one or more lead screws (not shown) and guided by guides, in this embodiment, guide rods 121a, 121b.

Figure 3:
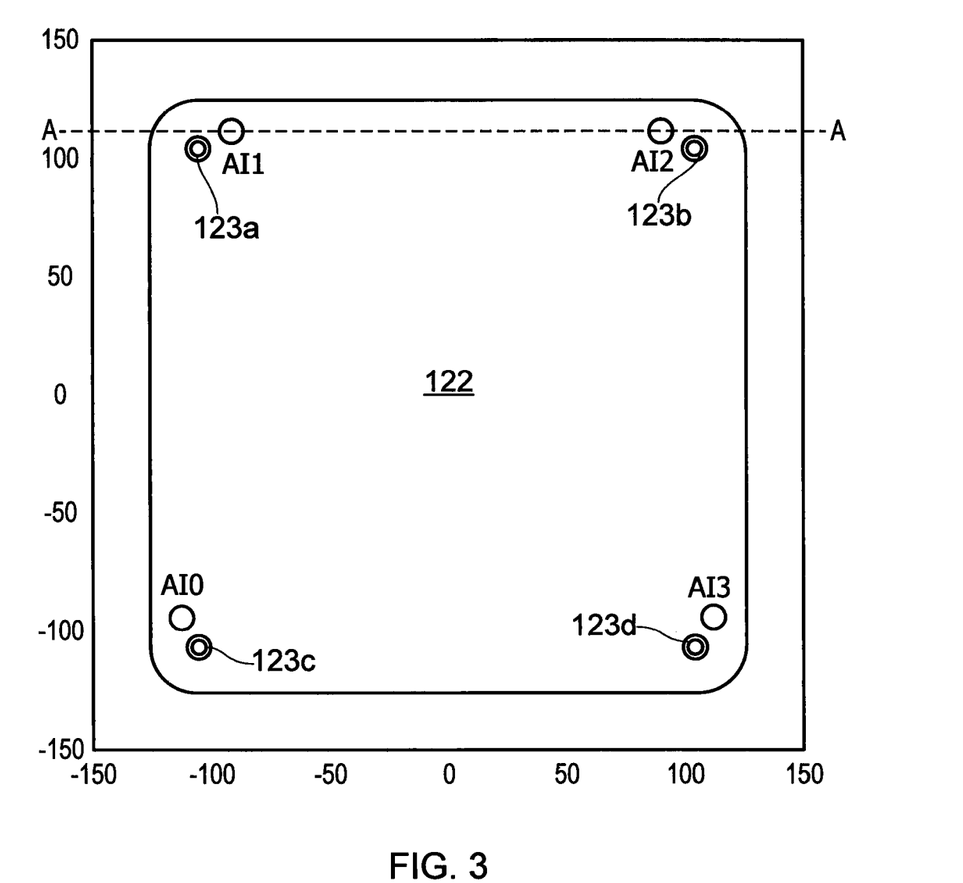
FIG. 3 is a plan view of a build substrate plate located on the build platform of FIG. 1, wherein locations of the underlying acoustic waveguides are shown.

Referring to FIG. 3, in use, a build substrate plate 122 is mounted on the build platform 102, typically using appropriate mounting formations, in this embodiment bolts 123a, 123b, 123c, 123d, although in another embodiment kinematic mounting formations may be used, as described in WO 2015/092442. The receiving ends 141a, 141b, 141c, 141d of the acoustic waveguides 140a, 140b are secured to a lower surface of the top plate 110 in a horizontal location that is in the vicinity of the mounting formations that are used to mount the build substrate plate 122 on the build platform 102. In this way, the signals generated by each acoustic sensing system AI0, AI1, AI2, AI3 can be attributed to the acoustic waves that are transmitted to the build platform 102 via the corresponding mounting formation 123a, 123b, 123c, 123d to which it is most closely located.

The further controller 131, comprising processor 161a and memory 162a, is connected to the acoustic emission sensors 109a, 109b to receive signals therefrom. The further controller 131 is arranged for analysing the signals received from the acoustic emission sensors 109a, 109b. Software stored in memory 162a is executed by processor 161a to carry out the method as described below. The further controller 131 may have a communication link with controller 130 allowing the acoustic data collected by the further controller 131 to be correlated with events in the AM machine controlled or recorded by controller 130, for example sensor data collected by other sensors within the additive manufacturing apparatus.

Figure 4:
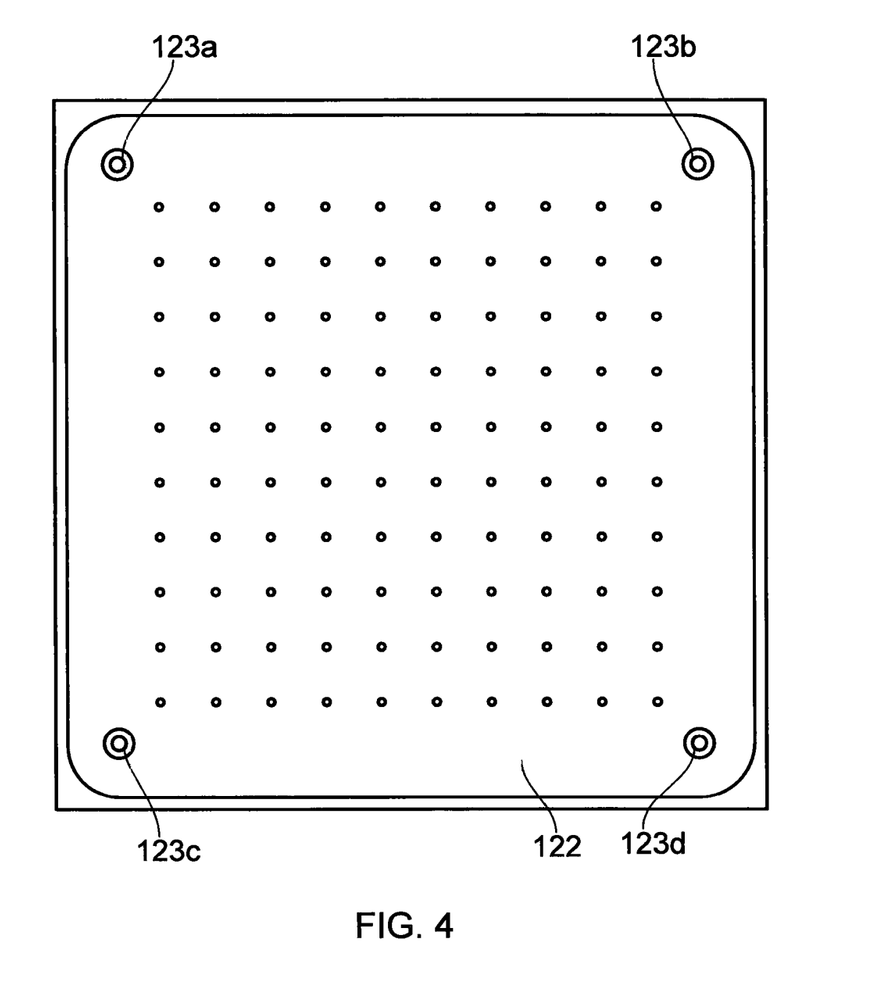
FIG. 4 is a plan view of the build substrate plate showing exposure points used for creating a Delta-T map of the build substrate.
Figure 5:
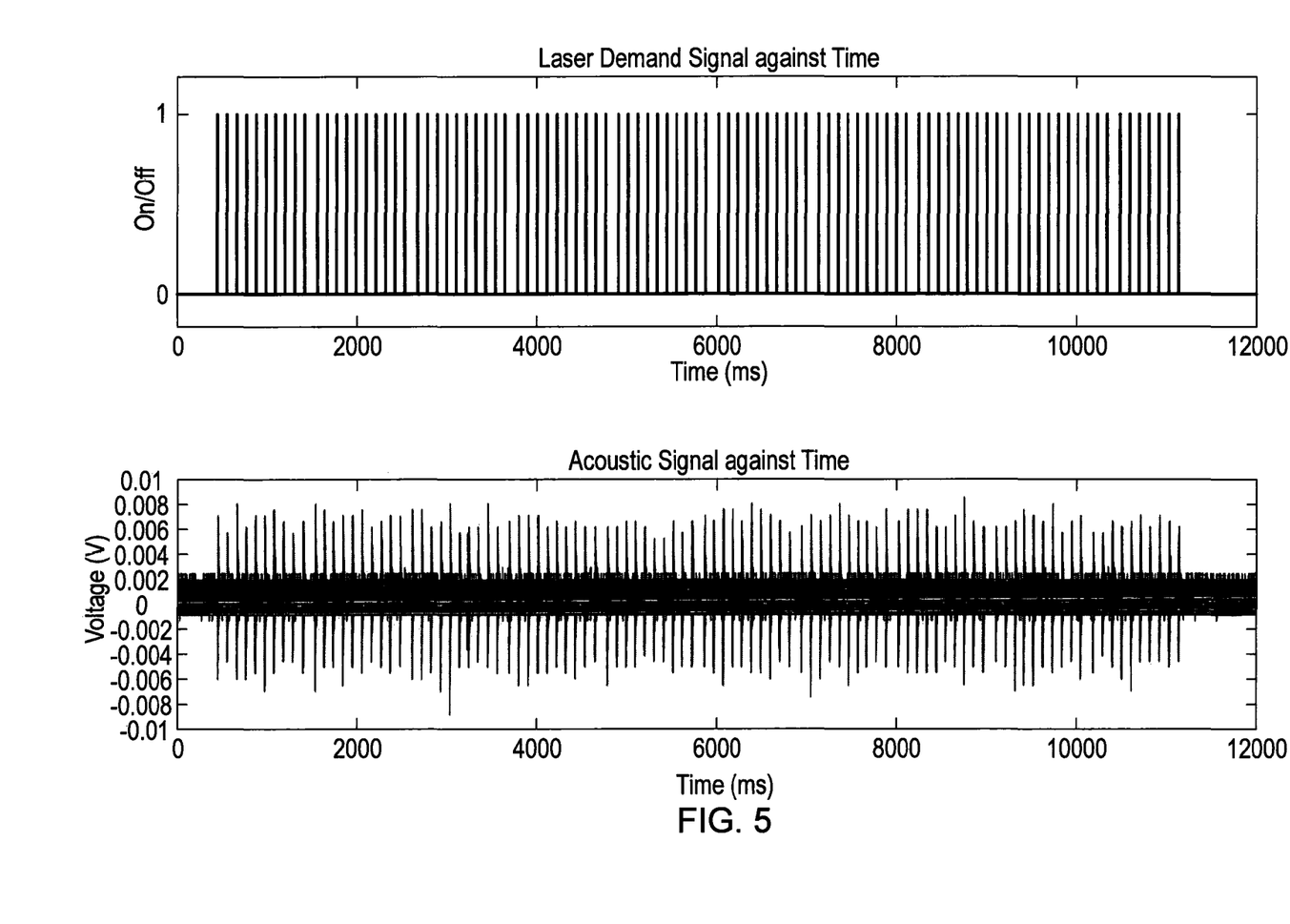
FIG. 5 is a graph showing the correlation between laser pulses and corresponding pulses of an acoustic signal detected by an acoustic emission sensor.

Before commencing the build, the acoustic sensing system AI0, AI1, AI2, AI3 is calibrated for the build substrate plate 122 that has been mounted on the build platform 102. This is carried out using a modified Delta-T mapping process. In such a process, a broad band acoustic signal is generated at a plurality of points on the build substrate plate 122. However, rather than generating such broad band acoustic signals through snapping of a lead pencil, the broad band acoustic signals are generated by firing one of the lasers at different points in a grid of points spread across the build substrate plate 122, as shown in FIG. 4. In this embodiment, each exposure comprises an exposure of the point with the laser beam for 30 microseconds and then a delay of 100 microseconds before the next point in the grid is exposed. FIG. 5 illustrates acoustic signals generated from exposures of the build substrate plate and a photodiode signals measuring the on-time of the laser. As can be seen, the acoustic signals clearly correlate with the exposures. It has been found that an intensity of the acoustic signals generated by a single exposure drops to background levels within 100 microseconds. Accordingly, exposures temporally spaced in this manner can be isolated from each other and analysed separately.

Figure 6:
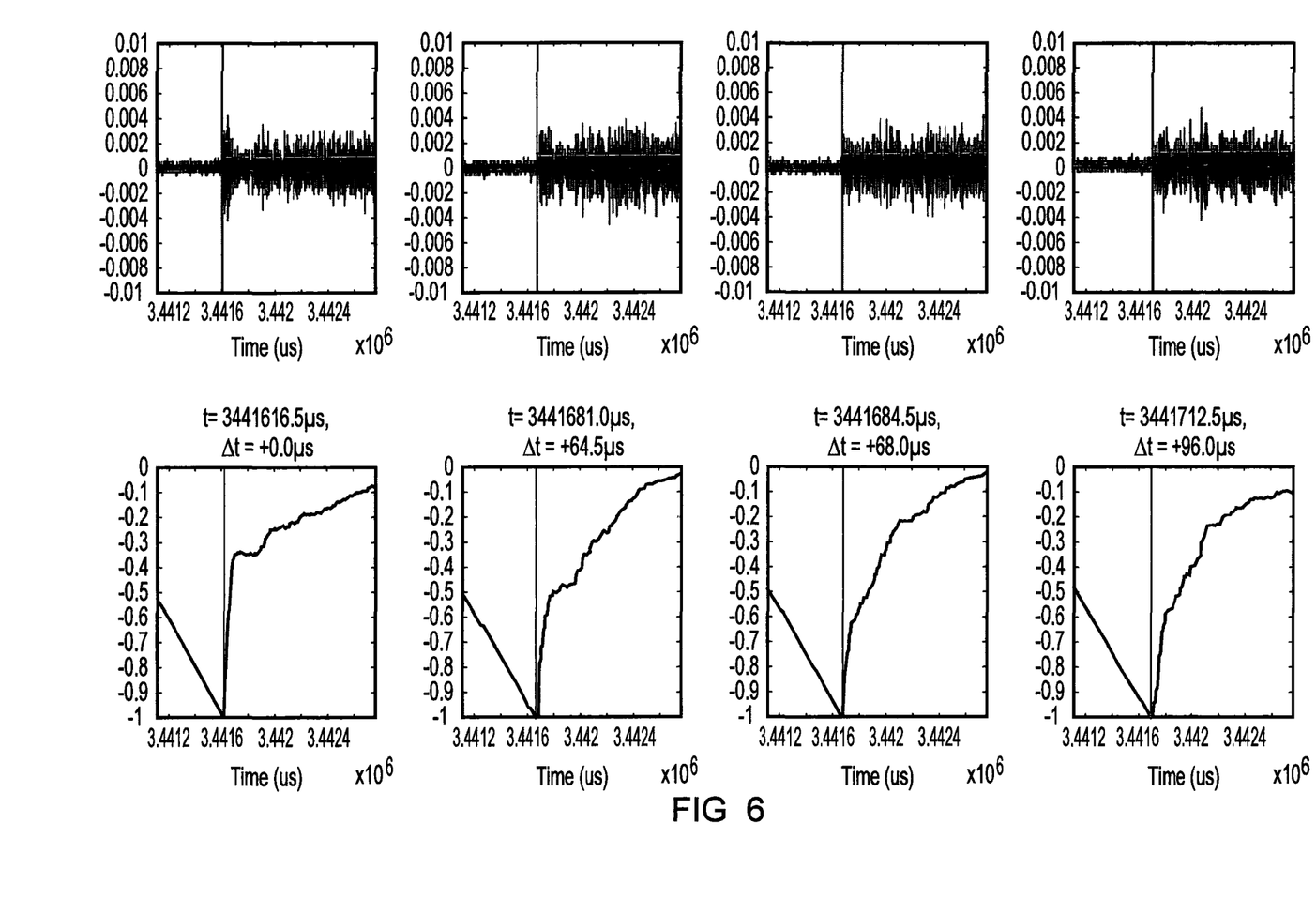
FIG. 6 is a graph showing the acoustic signals recorded by the acoustic emission sensors after an exposure of the build substrate and corresponding values as determined by the Akiake's Information Criterion algorithm as described in Analysis and Efficient Onset Time Detection of Acoustic Emission Signals with Power Constrained Sensor Platform, IEEE Sensors, Babjak, B., S. Szilvasi, P. Volgyesi, O. Yapar, and P. K. Basu, 2013.

For each exposure, the controller 130 identifies an arrival time at each acoustic emission sensor for a structure-borne acoustic wave generated by the exposure. A calibration map is generated for each pair of acoustic emission sensors identifying a difference in the arrival time of an acoustic wave for each sensor of the pair. The time of arrival (onset) of an acoustic wave at an acoustic emission sensor is determined using Akiake's Information Criterion (AIC) as described in Analysis and Efficient Onset Time Detection of Acoustic Emission Signals with Power Constrained Sensor Platform, IEEE Sensors, Babjak, B., S. Szilvasi, P. Volgyesi, O. Yapar, and P. K. Basu, 2013. FIG. 6 illustrates signals generated by the four different acoustic emission sensors for a single exposure of the build substrate and the corresponding arrival times (the locations of the minima) as determined using the AIC algorithm. As can be seen differences in the time of arrival vary over a range of about 100 microseconds.

Each point on the grid may be exposed a plurality of times to generate a plurality of arrival times for each point. An average of these arrival times may then be used for determining the calibration maps. Clear outliers in the arrival times may be removed from consideration.

During the build, the Delta-T mapping is used to identify the location of a source of acoustic signals, such as a crack or delamination within the part. In particular, a time of arrival of an acoustic signal generated by the crack, delamination or the like at each acoustic emission sensor can be compared to the calibration maps created for each pair of acoustic emission sensors and the location of the source identified through triangulation.

Figure 7:
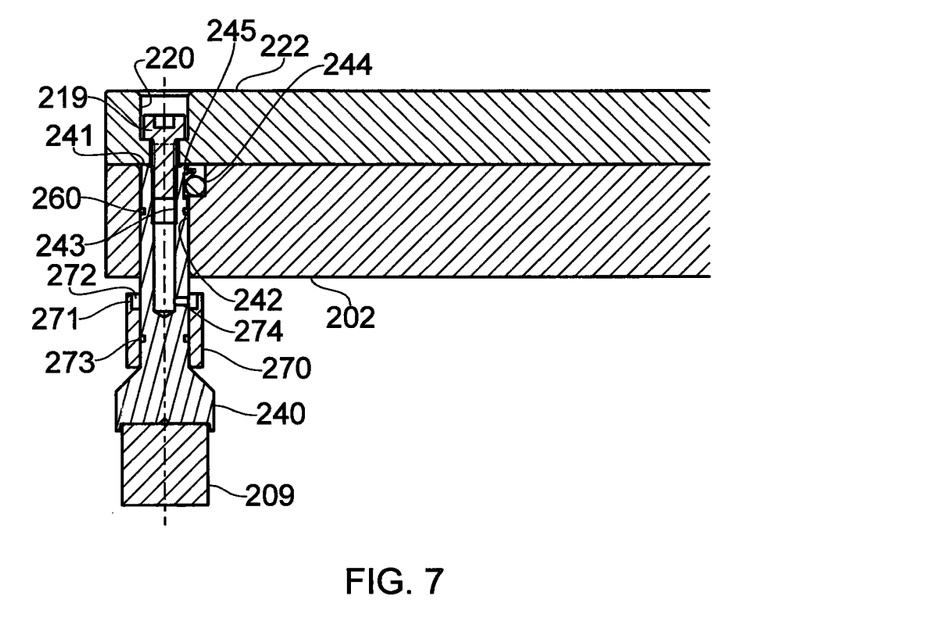
FIG. 7 is a cross-sectional view of an acoustic sensing system according to another embodiment of the invention.
Figure 8:
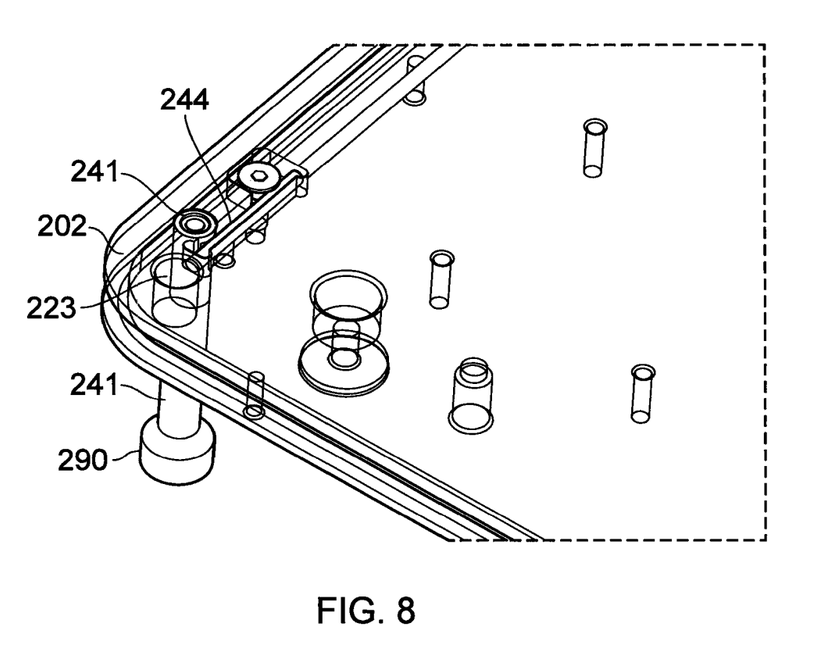
FIG. 8 is a perspective view of the acoustic monitoring system shown in FIG. 7, with portions of the view shown in shadow to enable features of the acoustic system to be seen.
Figure 9:
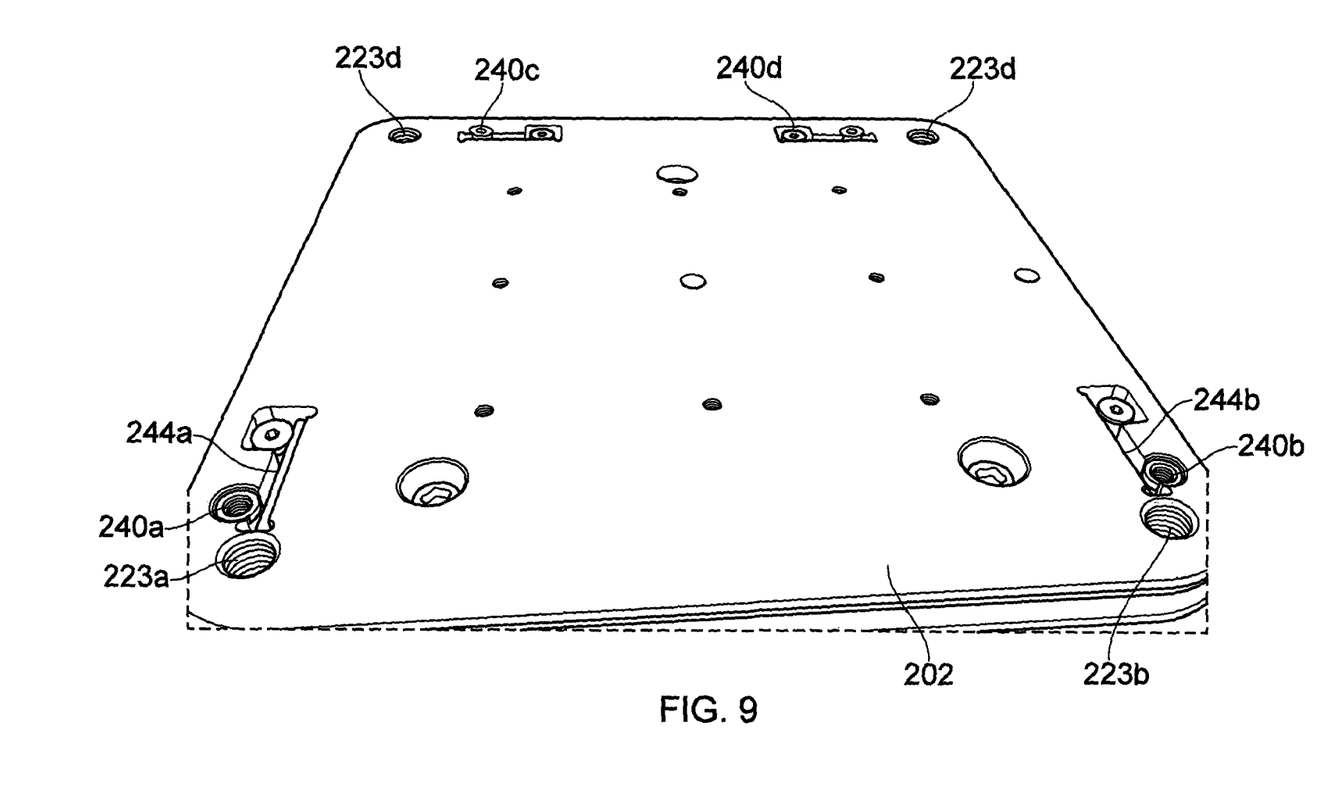
FIG. 9 is a perspective view of the acoustic sensing system shown in FIGS. 7 and 8.

Referring to FIGS. 7, 8 and 9, an acoustic sensing system according to another embodiment of the invention is shown. Features in this embodiment that correspond to features of the previously described embodiment have been given the same reference numerals but in the series 200. Features that remain unchanged between the two embodiments will not be described in detail again and reference is made to the description above for these features.

This embodiment differs from the previously described embodiment in that each waveguide 240a to 240d extends through a corresponding channel 242 in the build platform 202 such that a receiving end of the waveguide 240a to 240d distal from the acoustic sensor 209a to 209d can extend out from an opening in an upper surface of the build platform 202 to contact a build substrate plate 222. The build substrate 222 is secured to the build platform 202 in a conventional manner using bolts (not shown) and bolt holes 223a, to 223d. Each waveguide 240 has a corresponding threaded bore 243 for receiving a bolt 219 that is inserted through a hole 220 in the build substrate plate 222.

Each waveguide 240 is retained "floating" in the corresponding channel 242 by a cross pin 244 that is received in a notch 245 in a side of the waveguide 240 such that the waveguide 240 can move in a longitudinal direction in the channel 242. The cross pin 244 is located in a recess from an upper surface of the build platform 202 and extends across the channel 242 and defines with the notch 245 an extent that the waveguide 240 can move in a longitudinal direction in the channel 242. An amount of longitudinal movement permitted is enough to allow a receiving end 241 of the waveguide 240, distal from the acoustic emission sensor 209, to engage with a lower surface of the build substrate plate 222.

The build substrate 222 is attached in place on the build platform 202 by bolting the build substrate plate 223 to the build platform 202. Each waveguide 240a to 240d is then secured in contact with a lower surface of the build substrate plate 222 using bolts 219 that pull the waveguide 240 against the lower surface of the build substrate plate 222.

A circumferential groove and corresponding seal 260 are provided around the waveguide 240, the seal engaging a wall of channel 242 to prevent powder from passing between the walls of the channel 242 and the waveguide 240, whilst allowing the small amount of longitudinal movement of the waveguide 240 in the channel 242.

A horizontal gas passageway 274 is provided in each waveguide 240 connecting a distal end of the bore 243 to a gas inlet. In this way, gas below the build platform 202 can flow into a distal end of the bore 243 such that powder in the bore 243 can be sucked therefrom.

A powder trap 270 is provided around a portion of the waveguide 240 below the build platform 202. The powder trap 270 comprises an annular element having a stepped-cross section with an upper annular wall 271 spaced from an outer wall of the waveguide 240 to define, together with the outer wall of the waveguide 240, an annular trough 272 for collecting powder. A second circumferential groove and corresponding seal 273 are provided around the waveguide 240, the seal 273 engaging a wall of powder trap 270 to prevent powder from passing between the wall of the powder trap 273 and the waveguide 240. The gas passageway 274 is provided in communication with the annular trough 272 such that any powder that flows from the bore 243 out from the passageway 274 is captured within the trough 272. The powder trap 270 is provided as a precaution as, in normal operation, it is expected that powder will not flow from the bore 243 out of the gas inlet via gas passageway 274.

This second embodiment improves the transmission of acoustic waves to the acoustic sensor 209 as the waveguides 240a to 240d directly contact the build substrate plate 222, whilst powder is prevented from interfering with sensitive devices of the apparatus located below the build platform.

It will be understood that modifications and alterations can be made to the above described embodiment without departing from the invention as described herein. For example, the acoustic emission sensors and/or acoustic waveguides may be located within the build substrate and sealed from the powder by an appropriate seal provided around the aperture in the build substrate in which the acoustic emission sensor or acoustic waveguide is inserted. Other methods may be used to provide a waveguide held in a floating condition within the build platform.

The invention claimed is:

1. A powder bed additive manufacturing apparatus comprising a build sleeve, a build platform for supporting a powder bed and object during a build, the build platform lowerable in the build sleeve, and at least one acoustic sensing system comprising an acoustic emission sensor and an acoustic waveguide, the acoustic waveguide extending through the build platform such that a receiving end of the acoustic waveguide distal from the acoustic emission sensor abuts a surface of a build substrate releasably mounted to the build platform to transmit structure-borne acoustic waves from the build substrate to the acoustic emission sensor, wherein the acoustic waveguide extends through a channel in the build platform that is open at an upper surface of the build platform such that the acoustic waveguide is able to contact the build substrate when mounted on the upper surface of the build platform.

2. A powder bed additive manufacturing apparatus according to claim 1, comprising fixing means configured to hold the acoustic waveguide against the build substrate.

3. A powder bed additive manufacturing apparatus according to claim 2, wherein the fixing means is a bolt and complementary threaded bore.

4. A powder bed additive manufacturing apparatus according to claim 3, wherein the complementary threaded bore is in the acoustic waveguide and the bolt extends through the build substrate such that access to the bolt for tightening within the complementary threaded bore is provided at a top of the build substrate.

5. A powder bed additive manufacturing apparatus according to claim 4, wherein the acoustic waveguide comprises a gas inlet arranged in proximity to a distal end of the threaded bore to allow gas to be drawn into the distal end of the bore.

6. A powder bed additive manufacturing apparatus according to claim 5, comprising a gas passageway connecting the gas inlet in gaseous communication to the threaded bore, the gas passageway arranged such that powder that enters the gas passageway from the bore does not flow to the gas inlet during normal operation.

7. A powder bed additive manufacturing apparatus according to claim 5, comprising a powder trap arranged to capture powder that exits the threaded bore via the gas inlet.

8. A powder bed additive manufacturing apparatus according to claim 1, wherein the acoustic waveguide is held within the channel in the build platform so as to be movable within the channel towards the build substrate mounted on the build platform.

9. A powder bed additive manufacturing apparatus according to claim 8, comprising fixing means configured to pull or push the acoustic waveguide through the channel to contact the build substrate.

10. A powder bed additive manufacturing apparatus according to claim 1, comprising three or more acoustic sensing systems.

* * * * *